UNITED STATES PATENT OFFICE.

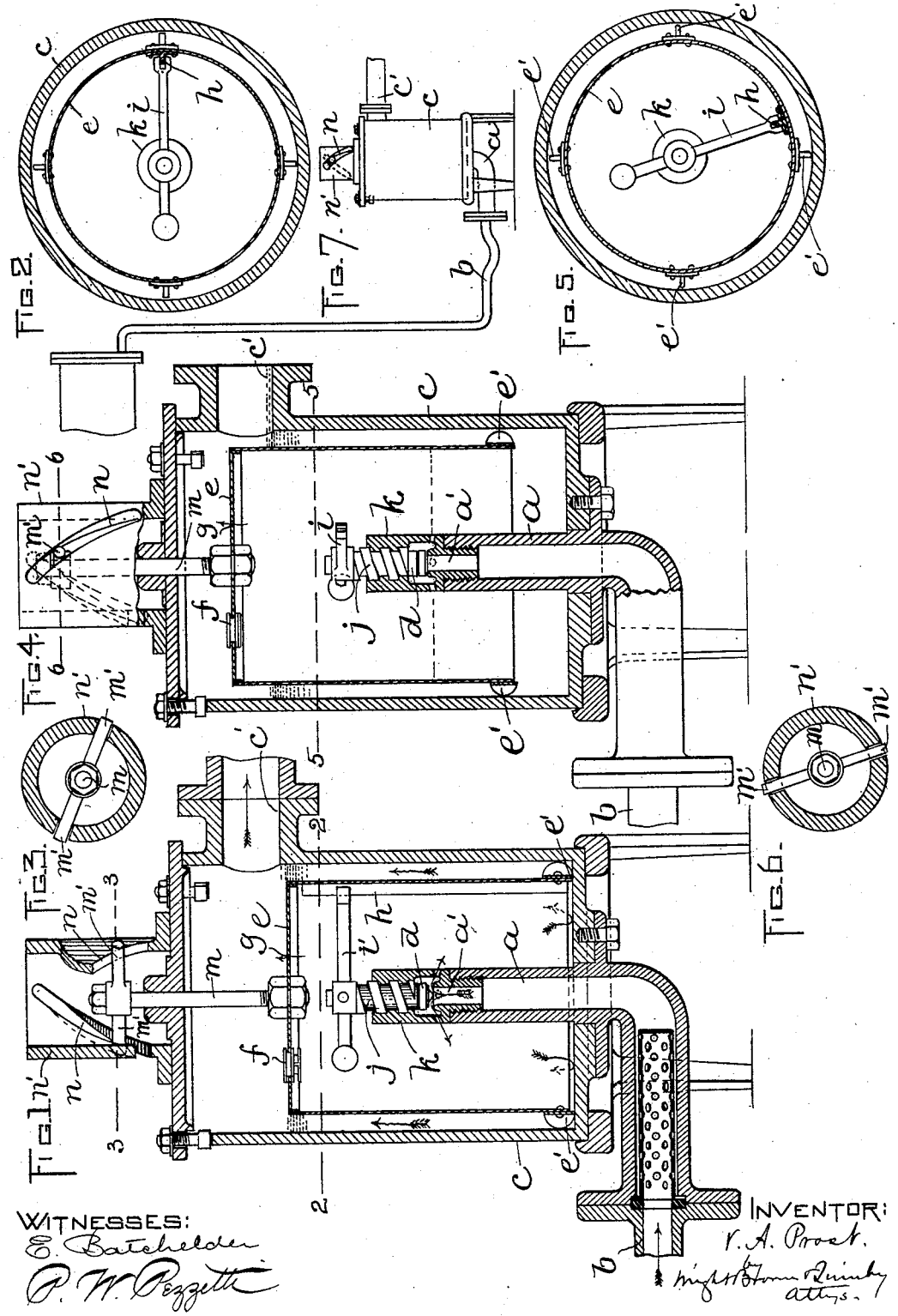

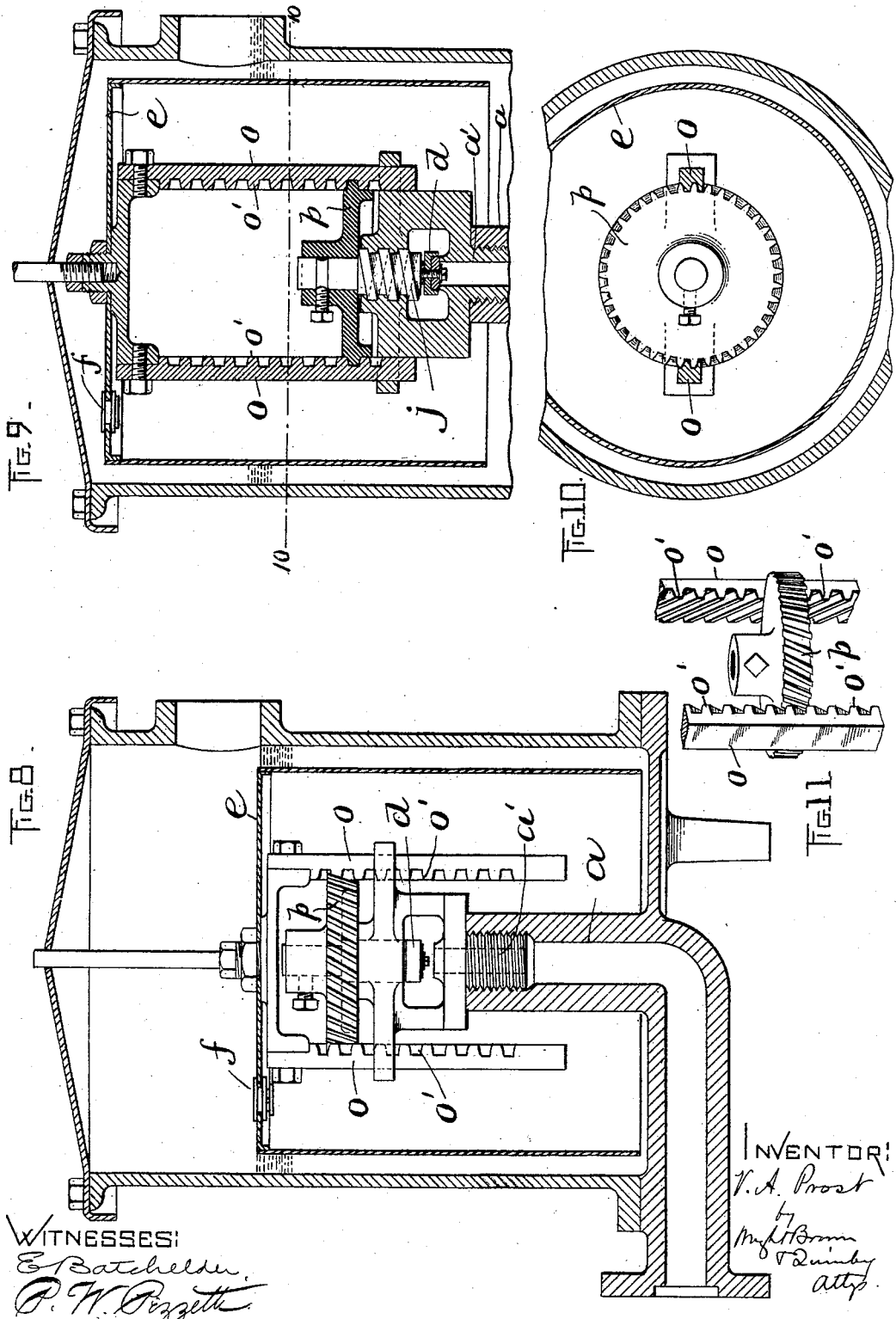

VICTOR AIMÉ PROST, OF MAYENMOUTIER, FRANCE, ASSIGNOR TO JOHN WILLIAM NASMITH, OF MANCHESTER, ENGLAND.

STEAM-TRAP.

SPECIFICATION forming part of Letters Patent No. 608,384, dated August 2, 1898.

Application filed December 30, 1897. Serial No. 664,698. (No model.) Patented in France April 16, 1890, No. 205,074; in England November 5, 1890, No. 17,819; in Germany June 1, 1891, No. 57,012, and in Switzerland June 20, 1891, No. 3,648.

*To all whom it may concern:*

Be it known that I, VICTOR AIMÉ PROST, of Mayenmoutier, France, have invented certain new and useful Improvements in Steam-Traps, (for which I have obtained Letters Patent of Great Britain, No. 17,819, dated November 5, 1890; of France, No. 205,074, dated April 16, 1890; of Germany, No. 57,012, dated June 1, 1891, and of Switzerland, No. 3,648, dated June 20, 1891,) of which the following is a specification.

This invention has for its object to provide a steam-trap adapted to permit the escape of the water of condensation without permitting the escape of live steam; also, to provide a trap which is free from liability to be burst or injured by steam-pressure.

The invention consists in the improvements which I will now proceed to describe and claim.

Of the accompanying drawings, forming a part of this specification, Figure 1 represents a vertical central section of a steam-trap embodying my invention. Fig. 2 represents a section on line 2 2 of Fig. 1. Fig. 3 represents a section on line 3 3 of Fig. 1. Fig. 4 represents a view similar to Fig. 1, showing the valve which controls the steam and hot-water conduit closed. Fig. 5 represents a section on line 5 5 of Fig. 4. Fig. 6 represents a section on line 6 6 of Fig. 4. Fig. 7 represents a side elevation showing the trap connected with a source of supply of steam and water. Fig. 8 represents a sectional elevation showing a different construction of the pressure-controlled valve-operating mechanism, the valve being open. Fig. 9 represents a view similar to Fig 8, showing the valve closed. Fig. 10 represents a section on line 10 10, Fig. 9. Fig. 11 represents a perspective view showing certain details.

The same letters of reference indicate the same parts in all the figures.

In the drawings, and referring first to Figs. 1 to 7, inclusive, $a$ represents a conduit which receives water and steam from a boiler through a pipe $b$, the conduit being here shown as having a substantially horizontal portion and a substantially vertical portion, the latter being secured to and passing through the bottom of a receptacle $c$. The conduit $a$ has an outlet $a'$, surrounded by a valve-seat on which a valve $d$ is adapted to close to prevent the escape of water through the outlet $a'$. When the valve is open, matter passing through the outlet $a'$ escapes into the receptacle $c$. Mechanism is provided for opening and closing the valve $d$, said mechanism being organized to be controlled by variations of pressure in the receptacle $c$. I will first describe the mechanism organized as shown in Figs. 1 to 7, inclusive.

$e$ represents a floating chamber or float adapted to rise and fall in the receptacle $c$, said float being closed at its upper end and open at its lower end and provided in its head or top with an outlet having a valve $f$, adapted to be moved to close said outlet by pressure within the float. The head or top of the float is also provided with a normally open contracted outlet $g$. Within the float is a vertical rib $h$, which is engaged with the outer end of an arm $i$, affixed to a screw $j$, which works in a nut $k$, affixed to the conduit $a$. The valve $d$ is engaged with the screw $j$ and is raised and lowered by the rotation of said screw.

$m$ represents a rod secured to the head of the float $e$ and extending through the top of the receptacle $c$, its upper end being provided with arms $m'\ m'$, which enter helical slots $n\ n$ in a cylindrical piece $n'$, affixed to the head of the receptacle $c$. The relative inclination of the slots $n\ n$ and the thread of the screw $j$ is such that upward movement of the float $e$ will cause a rotation of said float, due to the movements of the arms $n'$ in the slots $n$ in the direction required to close the valve $d$, in consequence of the rotation of the screw $j$, due to the engagement of the arm $i$ with the rib $h$ in the float $e$. When the float $e$ descends, the opposite action takes place and the valve $d$ is opened.

The operation of the above-described apparatus is as follows: The receptacle $c$ must be first filled with water up to the level of the outlet or overflow c'. The pipe b being opened to connect the conduit a with the cylinder or piping to be cleared, the steam may be turned on. The float e being depressed and the valve d consequently open, the air which is driven before the steam escapes from the conduit a into the float e and receptacle c. Water follows the air and is added to the supply already in the receptacle c, causing an overflow through the outlet c', the water finding its way under the lower end of the float e, which is preferably supported above the bottom of the receptacle c by short legs or projections e', affixed to the float e. The water gradually becomes hotter and hotter, heating the vertical portion of the conduit a, until by the time the water in immediate contact with the steam arrives in the lower portion of said conduit the water surrounding the vertical portion of the conduit is above the boiling-point and low-pressure steam is given off within the float e in sufficient quantity to close the valve f and raise the float, thus closing the valve d. The inflow being checked, the temperature of the water is reduced, and pressure being reduced within the float e the valve f opens and the float falls by its own weight, causing the opening of the valve d and letting more water escape from the conduit into the receptacle c. These oscillations of the cylinder continue for a few minutes, gradually diminishing in amplitude until the float assumes a fixed position and remains stationary. The whole apparatus is then in equilibrium, the valve d having adjusted itself and regulated the outlet of the conduit so as to just permit under the pressure of the steam, whatever it may be, the outflow of the water of condensation at the same rate as that at which it forms, and neither more nor less is allowed to flow. The air dissolved in the water in the float e finds its exit through the small outlet g as fast as liberated, this outlet being too small to have any effect on the pressure in the float.

In the construction shown in Figs. 8, 9, 10, and 11 the float e contains two vertical rack-bars o o, on the inner faces of which are cut helical rack-teeth o'. These teeth mesh with the correspondingly-formed teeth of the gear p, affixed to the screw j, which carries the valve d. The form of the teeth on the rack-bars o and gear p is such that an upward movement of the float e closes the valve d, while a downward movement of the float opens the valve.

In the last-described construction the valve-operating mechanism is entirely inclosed within the float, while in each construction the valve-operating screw is located inside the float, so that the screw does not have to pass through a steam-tight packing and can therefore rotate without material frictional resistance. The float is therefore perfectly free to rise and fall and has only its own weight and the friction between the moving parts that rotate the loose screw to overcome. Consequently the float is extremely sensitive, so that a low-tension vapor is capable of closing the valve against high pressure in the conduit.

An important advantage of my improved trap is that the steam is condensed while in the conduit a and does not enter the body of the trap at all, so that however high the pressure there is no danger of the trap bursting.

I claim—

1. A steam-trap comprising a water-receptacle, a conduit for steam and water entering said receptacle and having an outlet therein, a float having a vertical movement in the receptacle and inclosing said outlet, a screw, a fixed nut, and a valve connected with the screw, all located within said float, the valve being adapted to open and close the outlet, and devices which coöperate with the float to rotate the screw and operate the valve when the float rises and falls.

2. A steam-trap comprising a water-receptacle, a conduit for steam and water entering said receptacle and having an outlet therein, a float having a vertical movement in the receptacle and inclosing said outlet, a screw, a fixed nut, and a valve connected with the screw, all located within said float, the valve being adapted to open and close the outlet, means for imparting a rotary movement to the float when it rises and falls, and connections between the float and screw whereby the latter is caused to rotate with the float.

In testimony whereof I have signed my name to this specification, in the presence of two subscribing witnesses, this 11th day of December, A. D. 1897.

VICTOR AIMÉ PROST.

Witnesses:
  SCHILT,
  J. SCHLEITER.